(12) United States Patent
Morrow (10) Patent No.: US 6,695,326 B2
(45) Date of Patent: Feb. 24, 2004

(54) TARPAULIN DOLLY AND METHOD OF USE THEREOF

(76) Inventor: Erick Leonard Morrow, 38546 N. Sheridan Rd., Beach Park, IL (US) 60099

( * ) Notice: Subject to any disclaimer, the term of this patent is extended or adjusted under 35 U.S.C. 154(b) by 57 days.

(21) Appl. No.: 10/045,210

(22) Filed: Oct. 23, 2001

(65) Prior Publication Data

US 2003/0075889 A1 Apr. 24, 2003

(51) Int. Cl.$^7$ ............................................. B62B 3/04
(52) U.S. Cl. ................................................ 280/79.11
(58) Field of Search ..................... 280/35, 30, 79.11, 280/79.2, 79.3; 150/154; 190/18 R, 18 A; 428/102, 131

(56) References Cited

U.S. PATENT DOCUMENTS

| | | | | |
|---|---|---|---|---|
| 1,871,570 A | * | 8/1932 | Weber | 150/154 |
| 2,465,847 A | * | 3/1949 | Coffey | 280/35 |
| 2,716,558 A | * | 8/1955 | Sullivan | 280/79.11 |
| 3,693,994 A | * | 9/1972 | Wilson | 280/79.2 |
| 3,769,916 A | | 11/1973 | Hogan | |
| 4,126,213 A | * | 11/1978 | McDonald | 190/18 A |
| 4,182,390 A | | 1/1980 | Renner | |
| 4,580,372 A | * | 4/1986 | Osborn | 428/131 |
| 4,596,397 A | * | 6/1986 | Conti | 280/79.11 |
| 4,709,479 A | | 12/1987 | Lavelette | |
| 4,756,394 A | * | 7/1988 | Cohen | 190/18 A |
| 4,880,491 A | | 11/1989 | Jacobs et al. | |
| 4,951,818 A | * | 8/1990 | Johnson | 190/18 A |
| 5,083,645 A | * | 1/1992 | Lee | 190/18 A |
| 5,477,962 A | | 12/1995 | Kalamon | |
| 5,800,021 A | | 9/1998 | Derr | |
| 6,105,470 A | | 8/2000 | Hutchins | |
| 6,112,413 A | | 9/2000 | Frakes et al. | |
| 6,116,117 A | | 9/2000 | Nicolos et al. | |

FOREIGN PATENT DOCUMENTS

| | | | | |
|---|---|---|---|---|
| CH | 381382 | * | 6/1952 | 280/79.11 |
| FR | 2539690 | * | 7/1984 | 280/79.11 |

* cited by examiner

Primary Examiner—Frank Vanaman
(74) Attorney, Agent, or Firm—James P. Hanrath (57) ABSTRACT

A tarpaulin dolly has a first base plate with a plurality of wheel assemblies attached to its underside surface. A flexible tarpaulin sheet is secured between an upper facing surface of the first base plate and a second base plate disposed above the sheet so as to provide a captured portion and a larger excess portion of the sheet. A method of moving material, article, or debris using the tarpaulin dolly which is particularly useful in removing used roofing shingles from a pitched roof, includes the steps of providing the tarpaulin dolly to a location, placing material, article, or debris upon the excess portion of the tarpaulin sheet or the second base plate, and moving the tarpaulin dolly.

13 Claims, 10 Drawing Sheets

TARPAULIN DOLLY AND METHOD OF USE THEREOF

BACKGROUND OF THE INVENTION

1. Field of the Invention

The present invention relates generally to dolly carriers of material, articles, or debris, and particularly to a tarpaulin dolly suited for use on uneven services, such as a pitched roof, and a method of moving material, article, or debris such as dislodged and removed used roof shingles.

2. Description of the Related Art

The use of wheeled dollies for moving material, articles, or debris and a wide variety of other objects is known in the prior art. More specifically, wheeled dollies heretofore devised and utilized are known to consist basically of familiar, expected, and obvious structural configurations, notwithstanding the myriad of designs encompassed by the crowded prior art which have been developed for the fulfillment numerous objectives and requirements. While such traditional devices fulfill their respective, particular objectives and requirements, wheeled dollies heretofore have been ill-suited for use in certain environments having uneven surfaces, such as a pitched, inclined roof.

By way of example, housing structures and the like are generally constructed with inclined roofs. The roofs are covered with a plurality of overlapping, horizontal, aligned rows of roof shingles. Once roof shingles are applied, in time, due to wear or re-shingling requirements, it is often desirable to dislodge and removed the applied roof shingles. Although pry bars and certain hand tools, such as the roof shingles remover tool disclosed in U.S. Pat. No. 4,182,390, the disclosure which is hereby incorporated by reference herein, can be employed for this purpose, it is now customary for roofers to use a variety a mechanical roof shingles removing machines. Known prior art roof shingle removing machines include the devices disclosed in the following U.S. Pat. Nos. 4,709,479; 4,880,491; 5,800,021; 6,105,470; 6,112,413; and 6,116,117, the disclosure of such patents being hereby also incorporated by reference herein. Usage of such machines necessitates a collection, moving, and removal of heavy piles of dislodged used roof shingles which are often fragmented, a laborious and time-consuming process which is complicated by difficulties presented by a sloped roof surface and its attendant height.

In U.S. Pat. No. 3,769,916 there is disclosed a roofing shingle dolly, for positioning piles of shingles upon predetermined location of a sloped roof, formed of a shingle support platform mounted upon casters for rolling up and down a sloped roof surface, and an adjustable, V-shaped fitting for engaging over and securing to the roof ridge, with a cable connecting the platform to the fitting and being releasably frictionally clamped to the platform so that a roofer may move the dolly towards or away from the fitting by pulling or loosening the cable and temporarily clamp it to hold the dolly in predetermined positions.

In U.S. Pat. No. 5,477,962 there is disclosed a container for supporting roofing materials and related totals including a base plate formed of a rigid material having upper and lower edges and tapering side edges therebetween. One upstanding lower wall is coupled at its lower edge to the lower edge of the base plate and upstanding side walls extending upwardly from the side edges of the base plate from the lower edge to along the side edges.

While the devices of the above referenced U.S. Pat. Nos. 3,769,916 and 5,477,962 fulfill their respective, particular objectives and requirements, the same patents do not disclose Applicant's tarpaulin dolly and method of use thereof which substantially departs from the conventional concepts and designs of the prior art, and in so doing provides an apparatus and method primarily developed for the purpose of removing dislodged roof shingles from an inclined roof.

SUMMARY OF THE INVENTION

In accordance with the present invention there is provided tarpaulin dolly comprising a first base plate having an upper facing surface and an underside surface, a plurality of wheel assemblies attached to the underside surface of the first base late, a tarpaulin sheet disposed upon an upper facing surface of the first base plate, a second base plate disposed above the tarpaulin sheet, and structure for securing the first and second base plates together and securing the tarpaulin sheet there between. The first and second base plates and the tarpaulin sheet have vertically aligned holes to accommodate a nut and bolt securement of the same, and the wheel assemblies, to each other. The tarpaulin sheet comprised of a strong, reinforced, flexible material, preferably in rectangular shape, has a flexibility sufficient to form an inner fold thereof neighboring at least one of the wheel assemblies to serves as a wheel chock brace with respect thereto. The tarpaulin sheet further includes handhold holes for hand grasping an area of said tarpaulin sheet near its outer periphery to aid in pull tow or moving of the tarpaulin dolly.

The present invention also includes a method of moving material, article, or debris using the tarpaulin dolly which is particularly useful in removing used roofing shingles from the environment of pitched roofs. The method includes the steps of (a) providing a tarpaulin dolly of the present invention to a location, (b) placing material, article, or debris upon the tarpaulin sheet or the second base plate, and (c) moving the tarpaulin dolly. Optional step of (d) unloading the material, article, or debris from tarpaulin dolly, may be employed.

The present invention advantageously provides a structure and method for collection, moving, and removal of material, article, or debris, such as heavy piles of dislodged used roof shingles, suitable for use on inclined surfaces. The tarpaulin dolly of the present invention and its method of use saves substantial time, manpower, an effort in many laborious and time-consuming tasks, such as the collection, moving, disposal of used roofing shingles, a process which is complicated by difficulties presented by a sloped roof surface and its attendant height.

Additional features and advantages of the present invention will become apparent to those skilled in the art from the following description and the accompanying figures illustrating preferred embodiments of the invention, the same being the present best mode for carrying out the invention.

DESCRIPTION OF THE PREFERRED EMBODIMENTS

Figure 1:
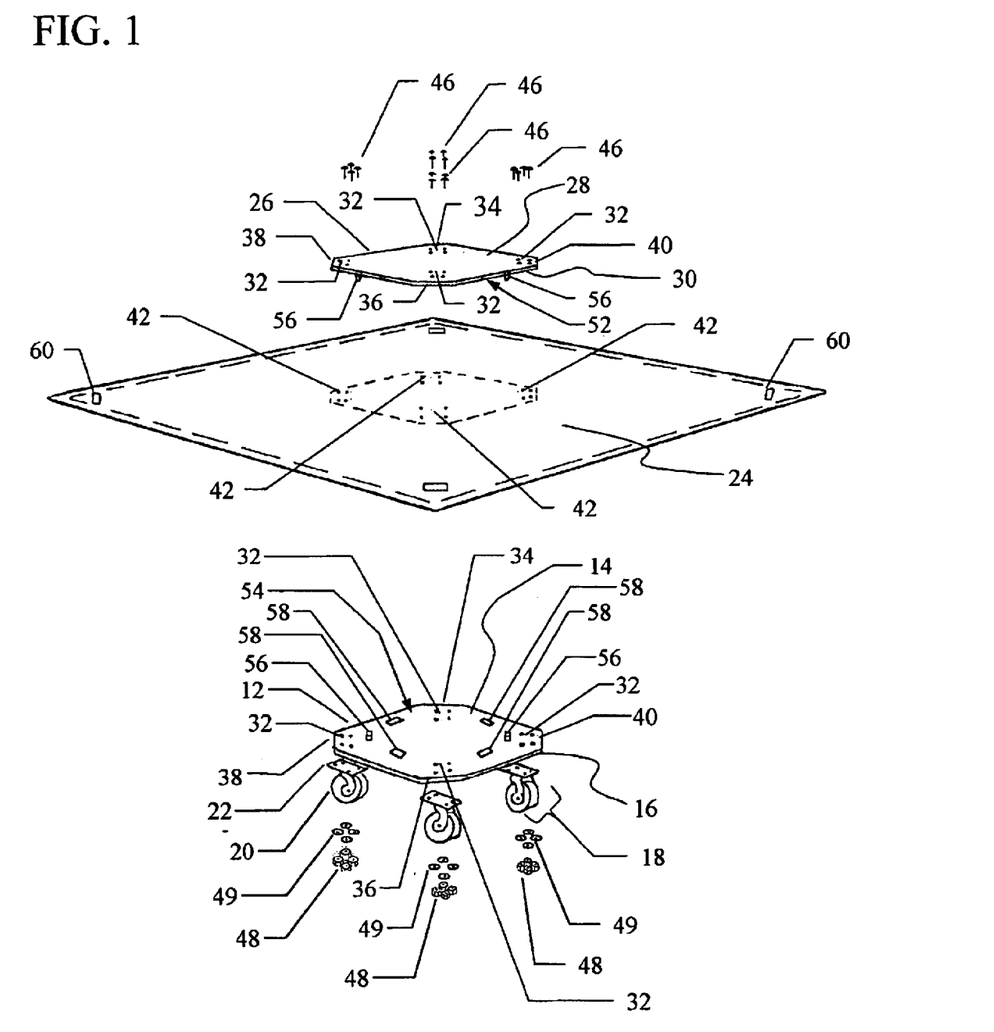
FIG. 1 is a front perspective view of the tarpaulin dolly according to the present invention with the components parts thereof vertically exploded from each other.
Figure 7:
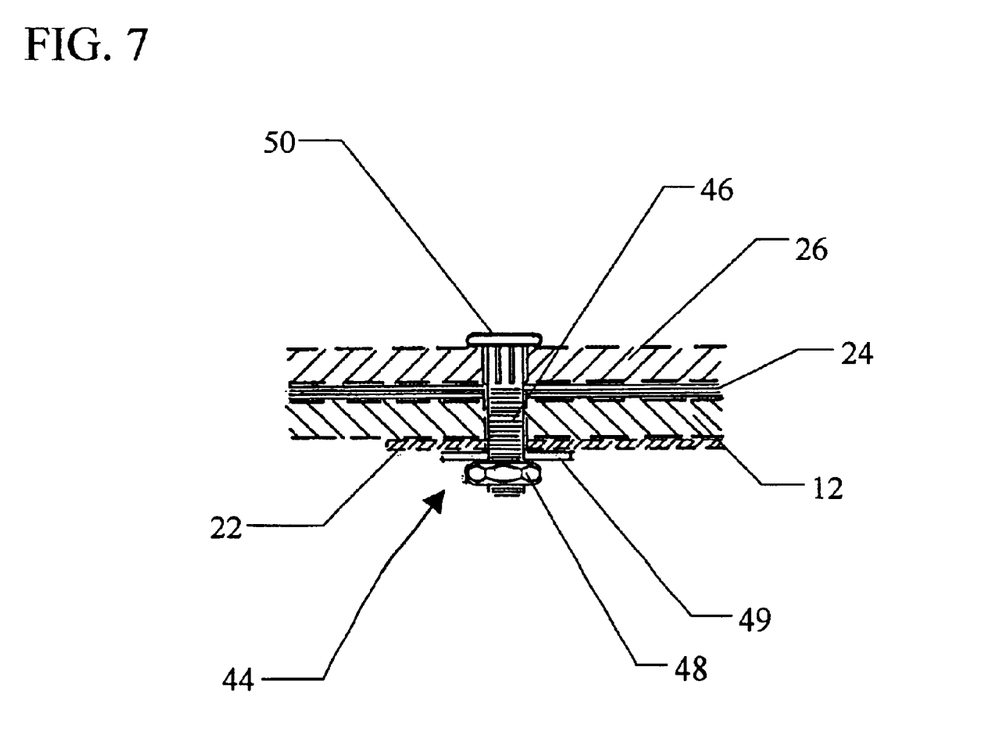
FIG. 7 is a cross-sectional side view of one point of the nut and bolt joinder of the components of the tarpaulin dolly to each other taken along line 7—7 of FIG. 6.

Referring now to the drawings, there is shown in FIG. 1 a frontal perspective view of a tarpaulin dolly 10 constructed in accordance with the teachings of the present invention wherein the various component parts thereof are vertically exploded from each other for ease of illustration and explanation. The tarpaulin dolly 10 includes a first base plate 12 having an upper facing surface 14 and an underside surface 16. A plurality of wheel assemblies 18 each comprised of a swivel caster wheel 20 and associated caster wheel set plate 22, are attached to the underside surface 16 of the first base plate 12 and a tarpaulin sheet 24 formed of strong, reinforced, flexible material, preferably in a rectangular shape, is disposed upon the upper facing surface 14 of the first base plate 12. A second base plate 26, likewise having an upper facing surface 28 and an underside surface 30, is provided for positioning of its underside surface 30 upon the tarpaulin sheet 24 in a manner cooperatively aligned with the first base plate 12 to accommodate means for securing the various component parts of tarpaulin dolly 10 together. In this regard, the second base plate 26, and the first base plate 12 each have a plurality of through holes 32 near each of their four corners 34, 36, 38, and 40 thereof which are capable of being axially vertically aligned both with respect to one another and also a corresponding set of vertical through holes 42 in the tarpaulin sheet 24 to thereby accommodate a means for securing the first and second base plates together while securing the tarpaulin sheet therebetween, such as a conventional nut and bolt assembly or, preferably, a panel stud bolt assembly 44. As illustrated at FIG. 7, the panel stud bolt assembly 44 may be comprised of panel stud bolt 46 and hex locking kepps nut 48 which secures, in vertical downward order, the second base plate 26, the tarpaulin sheet 24, the first base plate 12, the caster wheel set plate 22, and a washer 49 between panel stud bolt head 50 and hex locking kepps nut 48. Still further, as illustrated at FIG. 1., the underside surface 30 of the second base plate 28 and the upper facing surface 14 of the first base plate 12 are preferably provided with cooperative irregular surfaces 52 and 54, respectively, to better secure the tarpaulin sheet 24 between the same. The particular configuration of the irregular surfaces 52 and 54 may be of various embodiments so long as they achieve an adjacent complementary mating engagement. For example, the cooperative irregular surfaces may comprise a pattern of dimple projections serving as a gripping means upon the tarpaulin sheet secured between the irregular surfaces. Alternatively, the irregular surfaces may comprised a first plurality of concentric annular groves on the underside surface 30 of the second base plate 28 for coupling in an adjacent mating engagement with a corresponding cooperative second plurality of concentric annular groves of the upper facing surface 14 of the first base plate 12. Still further, the dimpled pattern or the cooperative pluralities of concentric annular grooves may be replaced with a male/female mating structure of various configurations wherein a male or female portion of one irregular surface is capable of being received, respectively, into a female or male portion of the other irregular surface to achieve a mating engagement upon the tarpaulin sheet. In the exploded view of FIG. 1, the upper facing surface 14 of the first base plate 12 is provided with a plurality of male elements 56 and female elements 58 cooperative with a plurality of adjacent complementary female and male elements at the underside surface 30 of the second base plate 28 to achieve such a mating engagement upon the tarpaulin sheet 24, and to thereby define a gripping means for securing the tarpaulin sheet between the first and second base plates.

Figure 2:
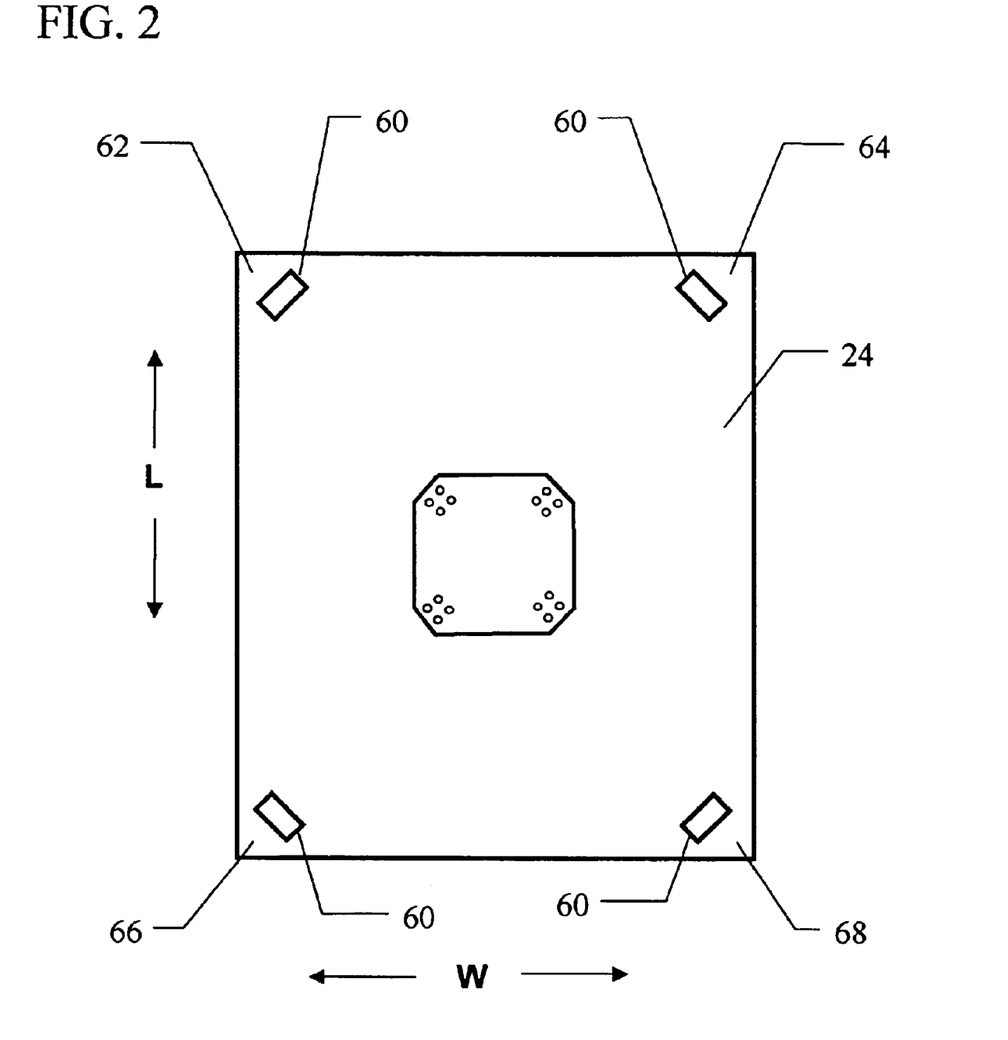
FIG. 2 is a top plan view of the tarpaulin dolly of the present invention.
Figure 3:
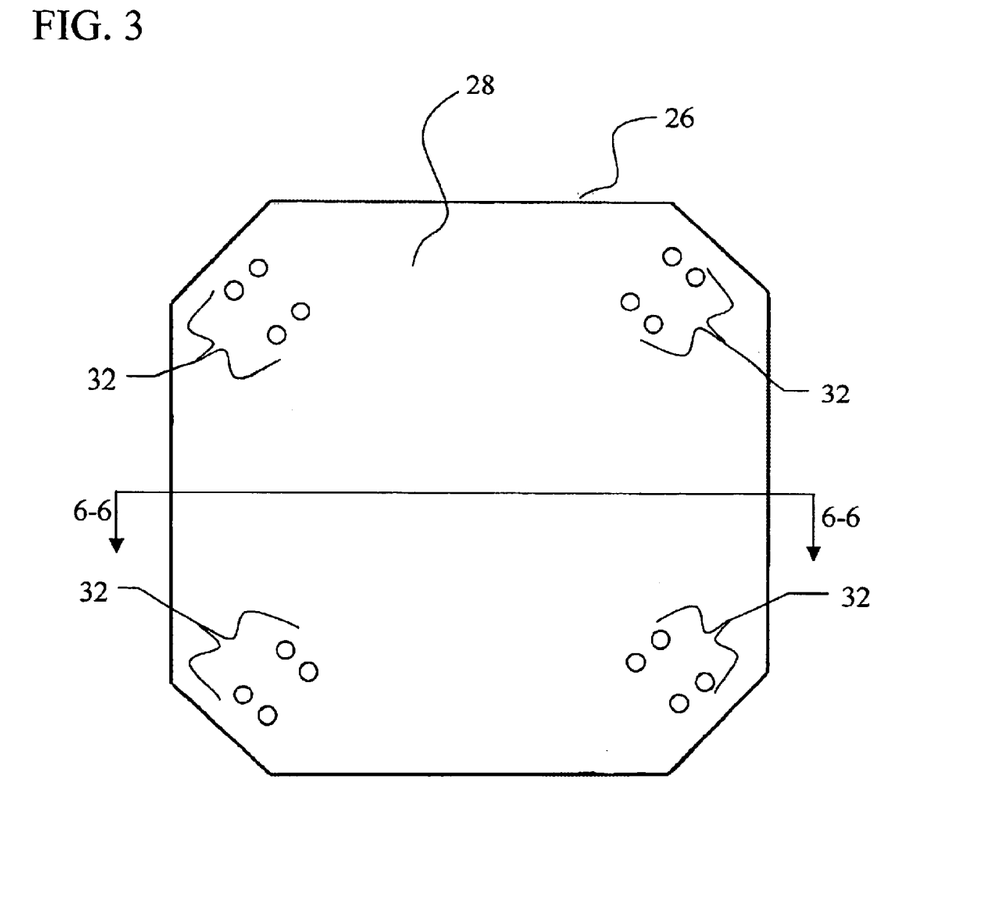
FIG. 3 is a top plan view of the central portion of the tarpaulin dolly of FIG. 2.

Referring now to the top plan view of FIG. 2, the tarpaulin sheet 24 preferably has a plurality of handhold holes 60 near its outer periphery. The handhold holes 60 of the tarpaulin sheet 24 serve as a means for hand grasping an area of said tarpaulin sheet near its outer periphery. Since the tarpaulin sheet 24 is preferably of rectangular shape, the tarpaulin sheet preferably has at least four handhold holes which serve as a point of hand grasp, at least one of such handhold holes being disposed among and near the outer periphery of each of the four corners 62, 64, 66, and 68 of the rectangular tarpaulin sheet. By hand grasping the handhold holes, a user of the tarpaulin dolly can pull tow move the same from location to location upon its caster wheels. The handhold holes 60 can be formed by "X" cuts into the surface of the tarpaulin sheet and the folds thereof reinforced stitched therein. Although the length L of the tarpaulin sheet 24 can vary, its width W is preferably approximately six feet to accommodate the arm span of a user to employ the handhold holes.

Figure 9:
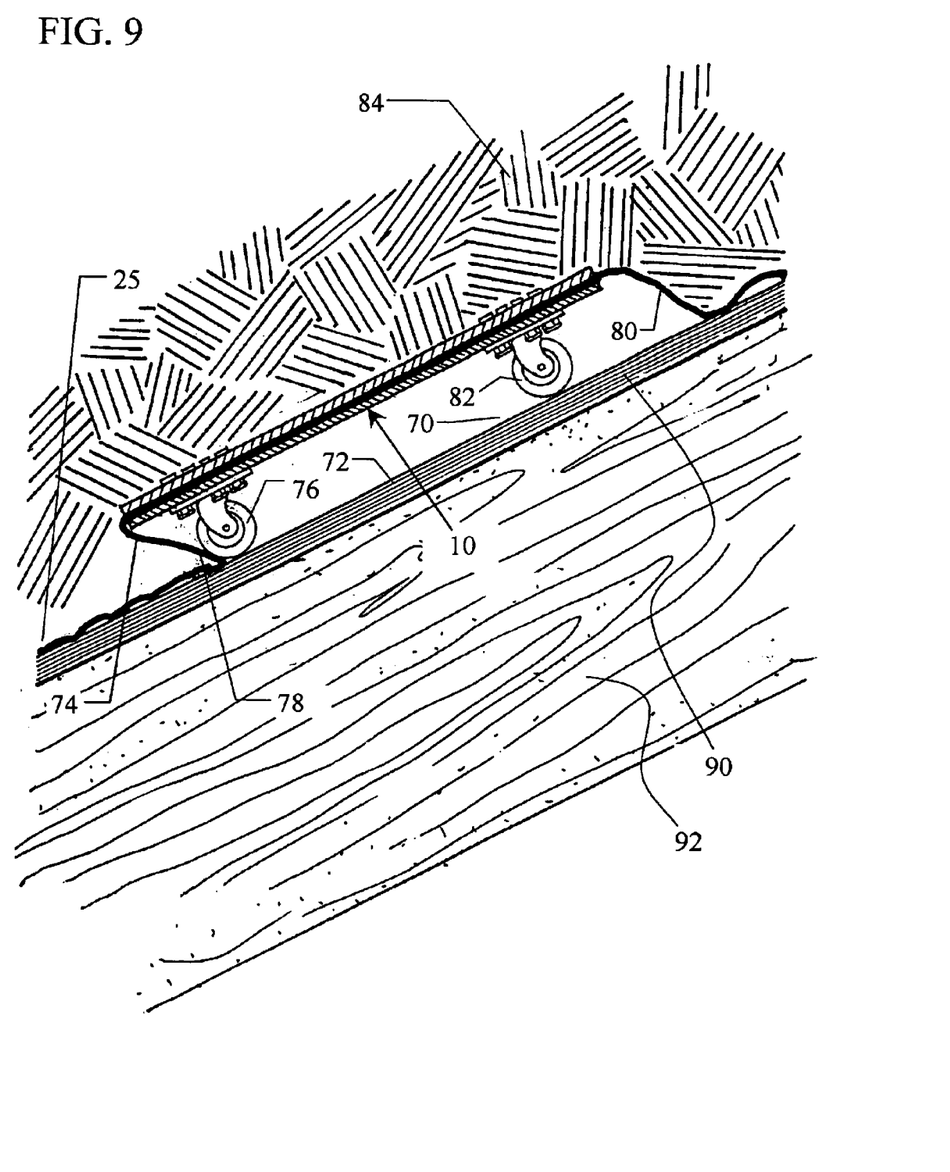
FIG. 9 is a side view of the tarpaulin dolly of FIG. 2 bearing a pile of debris and being set upon a pitched roof of a house, and illustrates a wheel chock action of the lower disposed set of wheels of the tarpaulin dolly by being braced against and held in place by an inward fold of an inner portion of a lower slope side of the tarpaulin sheet neighboring such lower disposed set of wheels.

The tarpaulin sheet 24 can be various strong, reinforced, layered materials provided it has a flexibility sufficient to form an inner fold thereof neighboring the plurality of wheel assemblies. In this regard, as illustrated in FIG. 9, when the tarpaulin dolly 10 is placed on an inclined surface, such as the pitch 70 of a roof 72, a low-side inner fold 74 of the tarpaulin sheet 24 located downwardly adjacent a lower disposed wheel assembly 76 functions with a wheel chock action to serve as a low-side brace 78 to at least one of the low-side plurality of wheel assemblies. At FIG. 9, a high-side inner fold 80 of the tarpaulin sheet 24 located upwardly adjacent the higher disposed wheel assembly 82 has no wheel chock action or brace function. Many durable and flexible commercially available materials or canvas may serve as a tarpaulin sheet 24 for the present invention, including the multilayered, vinyl laminated polyester fabric sold under the trademark "Hurculight" by Century Fabrics, Inc. of Lincolnwood, Ill.

Figure 4:
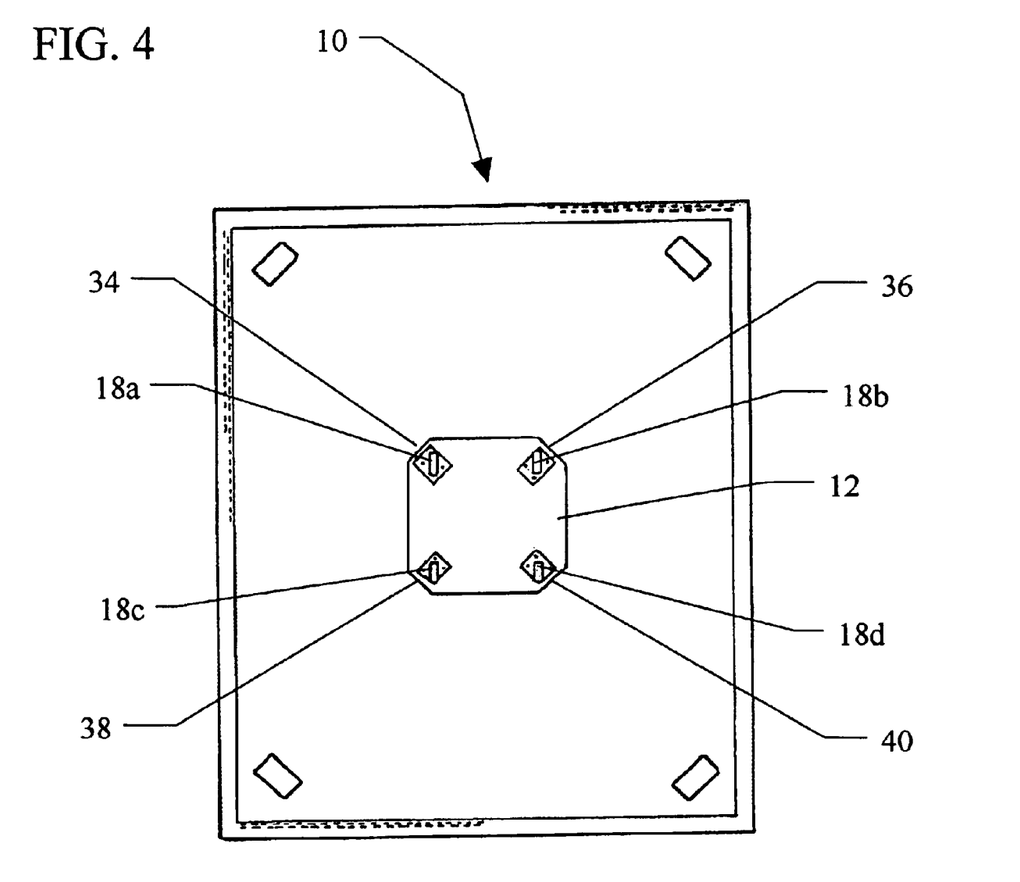
FIG. 4 is a bottom plan view of the tarpaulin dolly of FIG. 2.
Figure 5:
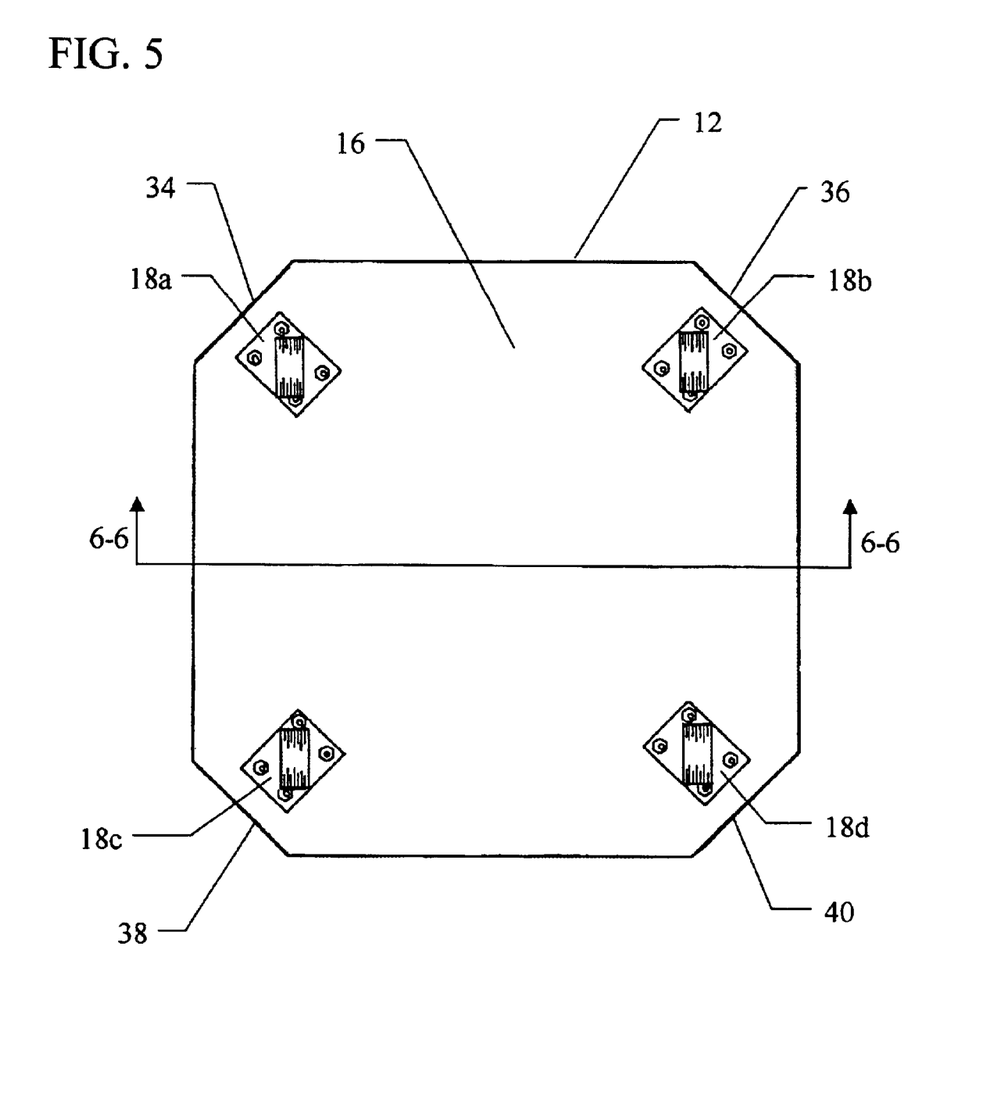
FIG. 5 is a bottom plan view of the central portion of the tarpaulin dolly of FIG. 2.
Figure 6:
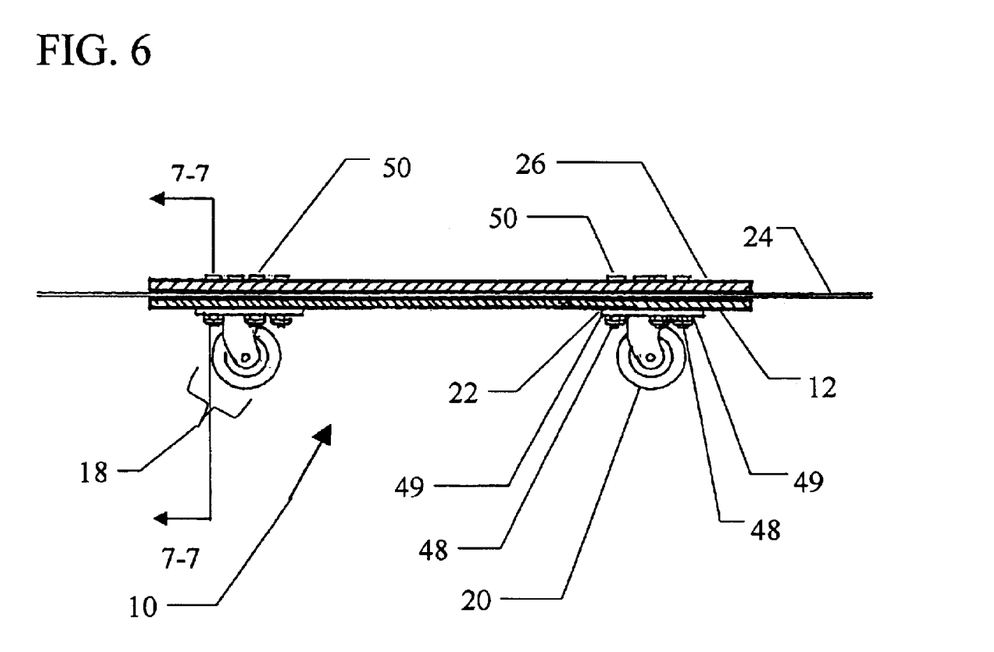
FIG. 6 is a cross-sectional side view of the central portion of the tarpaulin dolly subject, taken along line 6—6 of FIGS. 3 and 5.

As better observed in the bottom plan view of FIGS. 4 and 5, the underside surface 16 of the first base plate 12 of the tarpaulin dolly 10 includes a plurality of attached wheel assemblies 18, such as, preferably, the four wheel assemblies 18a, 18b, 18c, and 18d distributed near and among the four corners 34, 36, 38, and 40 of the underside surface 16 of the first base plate 12. The nut and bolt securement of the tarpaulin sheet between the first base plate and the second base plate further also attaches the plurality of wheel assemblies to the underside of the first base plate. As illustrated at the cross-sectional side view of the central portion of the tarpaulin dolly at FIG. 6, the panel stud bolt 46, hex locking kepps nut 48, and washer 49 secures, in vertical downward order, the second base plate 26, the tarpaulin sheet 24, the first base plate 12, the caster wheel set plate 22, and the washer 49 between panel stud bolt head 50 and hex locking kepps nut 48. This arrangement secures the swivel caster wheels in their respective four corner positions. FIG. 7 illustrates a cross-sectional side view of one point of the above described panel stud bolt assembly connection.

Figure 8:
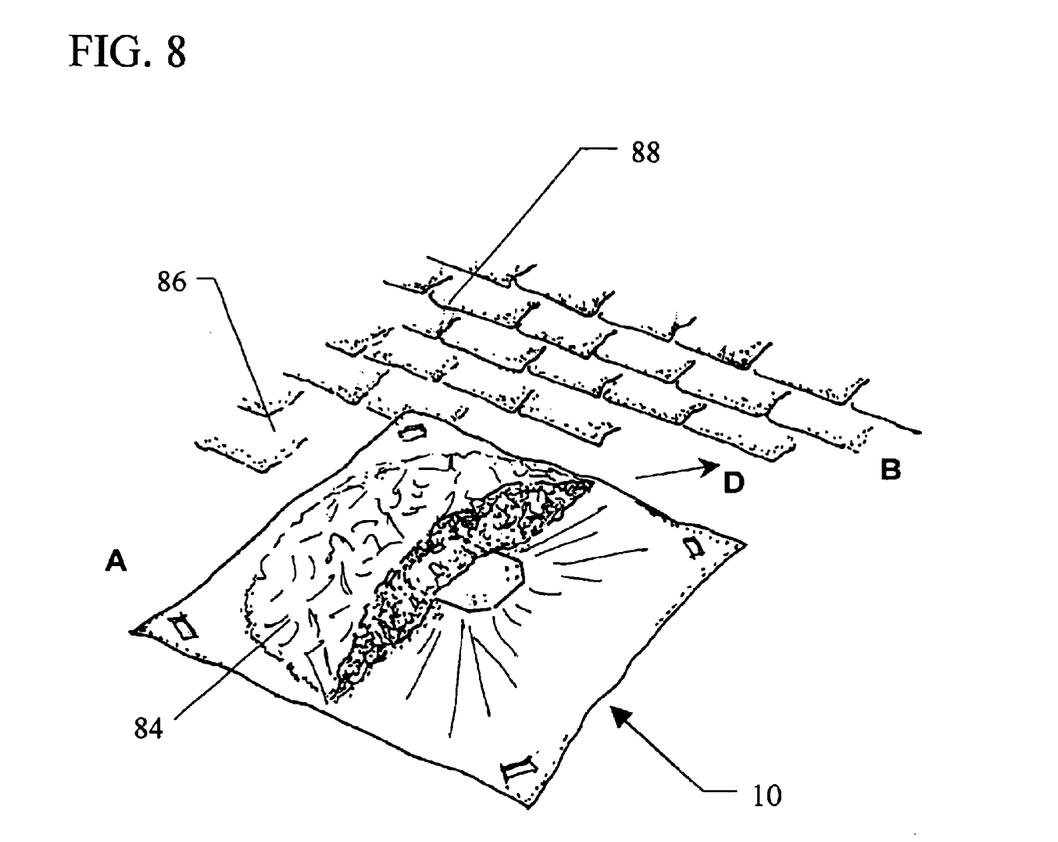
FIG. 8 is a perspective view of the tarpaulin dolly of FIG. 2 bearing a partial pile of debris and being set upon a pitched roof of a house.

FIG. 8 is a perspective view of the tarpaulin dolly 10 of the present invention located at position A bearing a partial pile of debris 84 and being set upon a pitched roof 86 of a house to aid in the removal of roof shingles 88. When roof shingles 88 are removed by machine or hand tool means, roofers may place the debris 84 (discarded, full or broken, removed roof shingles) upon the tarpaulin dolly 10 at location A before grasping handhold 60 to bring the tarpaulin dolly adjacent another location B for additional loading of debris upon the tarpaulin dolly.

Figure 10:
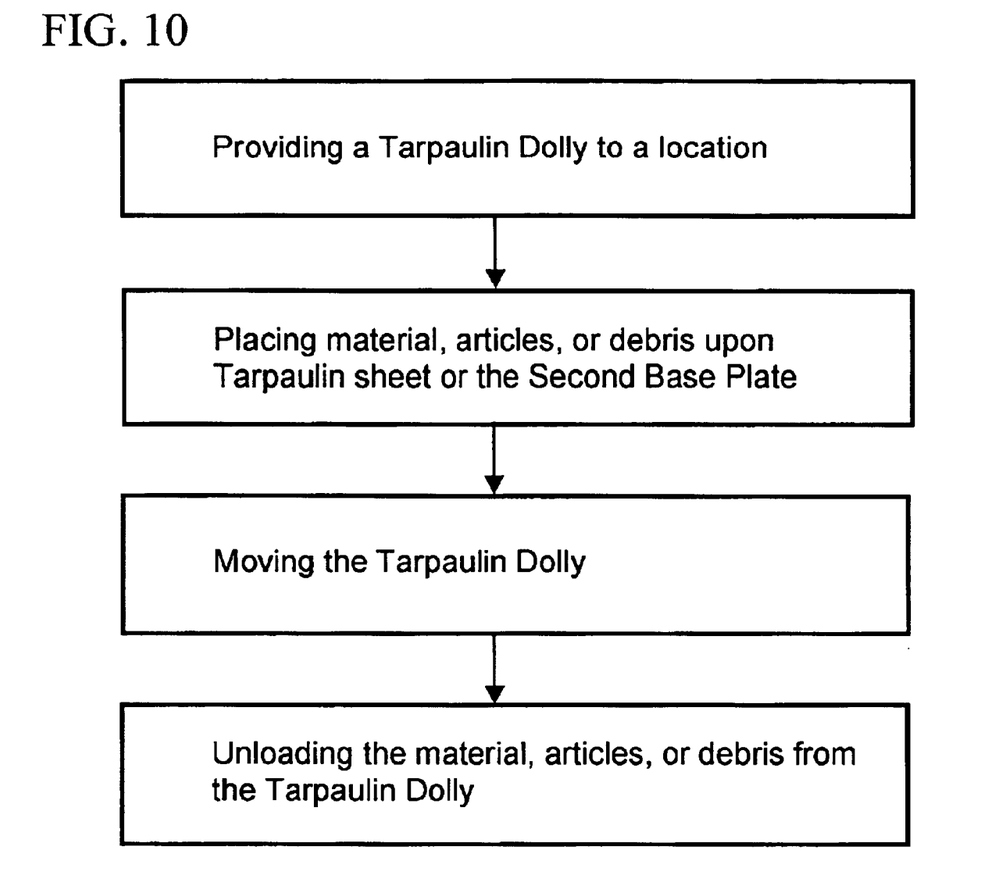
FIG. 10 is a flow chart which illustrates a method of moving materials or an article with the tarpaulin dolly of FIG. 2.

FIG. 10 is a flow chart which illustrates a method of moving material, an article, and/or debris with the tarpaulin dolly of the present invention. A first step of this method is providing a tarpaulin dolly of the present invention at a selected, specified, or desirable location, a second step of the method is loading the material, article, or debris upon an upper facing surface of the tarpaulin dolly, and a third step of the method is moving the loaded tarpaulin dolly. Optionally, the method of moving material, article, or debris may include the additional fourth step of unloading the material, article, or debris from the tarpaulin dolly of the present invention. FIGS. 8 and 9 also illustrates an implementation of such a method in association with removing used roofing shingles from a pitch roof. In FIG. 9, the tarpaulin dolly 10 comprises, as previously discussed, a first base plate having an upper facing surface and an underside surface, a plurality of wheel assemblies attached to the underside surface of the first base plate, a tarpaulin sheet disposed upon the upper facing surface of the first base plate, a second base plate disposed above the tarpaulin sheet, and means for securing the first and second base plates together and securing the tarpaulin sheet there between. When the tarpaulin dolly is placed on an inclined surface, such as the pitch 70 of a roof 72, the low-side inner fold 74 of the tarpaulin sheet 24 located downwardly adjacent a lower disposed wheel assembly 76 functions with a wheel chock action to serve as a low-side brace 78 to at least one of the low-side plurality of wheel assemblies. A pile of debris 84, such as used dislodged roofing shingles, removed by hand tools or special machinery known in the prior art, may be set upon the upper facing surface 25 of the tarpaulin sheet 24 and/or the upper facing surface 28 of the second base plate 26. As shown at FIG. 8, a user may then, by hand grasp employment of the handhold holes 60 of the tarpaulin sheet 24, pull tow or move the tarpaulin dolly from an initial location A in the arbitrary or desired direction D to another location B on the pitched roof for additional loading of dislodged roof shingle debris upon the tarpaulin dolly resultant from continued operation of the hand tools or roof shingle dislodgment machinery at an area of additional roof shingles to be removed. When a desired load is placed upon the tarpaulin dolly of the present invention, the tarpaulin dolly may be moved to an area adjacent or neighboring a convenient, desirable, selected edge 90 of the roof 72 near roof rafter 92 for fling or dump unloading of the dislodged and removed used roof shingle load from the tarpaulin dolly to a collection area or dump bin below.

From the foregoing description, it will be apparent that the tarpaulin dolly and its method of use of the present invention has a number of advantages, some of which have been described above and others of which are inherent in the invention. Also, it will be understood that modifications can be made to the present invention or its environment of use described above without departing from the teachings of the present invention. Accordingly, the scope of the invention is only to be limited as necessitated by the accompanying claims.

I claim:

1. A tarpaulin dolly comprising a first base plate having an upper facing surface, a side perimeter, and an underside surface, a plurality of wheel assemblies attached to said underside surface of said first base plate, a flexible tarpaulin sheet disposed above said upper facing surface of said first base plate having a captured portion and an excess portion, a second base plate having a side perimeter disposed above said captured portion of said flexible tarpaulin sheet, and means for securing said first and second base plates together and securing said captured portion of said flexible tarpaulin sheet there between, said excess portion of said flexible tarpaulin sheet extending outwardly of the entirety of said side perimeters of said first and second base plates so as, in use, to provide an inner fold of said excess portion adjacent the entirety of said side perimeters of said first base elate at a position proximal of said plurality of wheel assemblies and to provide a remainder of said excess portion at a position distal of said plurality of wheel assemblies, said inner fold of said excess portion, in use, being capable of serving as a brace to said plurality of wheel assemblies in a plane below said first base plate and said remainder of said excess portion, being capable of extending outwardly of the entirety of said side perimeters in a plane either above or below said second base plate.

2. A tarpaulin dolly according to claim 1 wherein said means for securing said first and second base plates together and securing said captured portion of said flexible tarpaulin sheet there between comprises said first and second base plates and said tarpaulin sheet having vertically aligned holes to accommodate a nut and bolt securement of the same to each other.

3. A tarpaulin dolly according to claim 2 wherein said nut and bolt securement further interconnects said plurality of wheel assemblies to the said underside of said first base plate.

4. A tarpaulin dolly according to claim 1 wherein said tarpaulin sheet comprises a strong, reinforced, flexible material in rectangular shape.

5. A tarpaulin dolly according to claim 1 wherein said plurality of wheel assemblies comprise four wheels distributed near and among four corners of the underside surface of said first base plate.

6. A tarpaulin dolly according to claim 1 wherein said tarpaulin sheet further includes means for hand grasping an area of said tarpaulin sheet near its outer periphery.

7. A tarpaulin dolly according to claim 1 wherein said means for hand grasping an area of said tarpaulin sheet near its outer periphery comprises said tarpaulin sheet having at least one hole which serves as a point of hand grasp.

8. A tarpaulin dolly according to claim 7 wherein said tarpaulin sheet is rectangular having at least four holes which serve as a point of hand grasp, at least one of said holes being distributed among and near the outer periphery of each of the four sides said rectangular tarpaulin sheet.

9. A tarpaulin dolly according to claim 1 wherein said underside surface of the second base plate and said upper facing surface of the first base plate are provided with cooperative irregular surfaces to aid the securement of said captured portion of said flexible tarpaulin sheet between the surfaces same.

10. A tarpaulin dolly according to claim 9 wherein said cooperative irregular surfaces define a gripping means upon the said captured portion of said flexible tarpaulin sheet between the irregular surfaces.

11. A tarpaulin dolly according to claim 10 wherein said gripping means comprise said cooperative irregular surfaces achieving an adjacent complementary mating engagement.

12. A method of moving material, article, or debris comprising the steps of (a) providing a tarpaulin dolly to a location, said dolly comprising a first base plate having an upper facing surface, a side perimeter, and an underside surface, a plurality of wheel assemblies attached to said underside surface of said first base plate, a flexible tarpaulin sheet disposed above said upper facing surface of said first base plate having a captured portion and an excess portion, a second base plate having a side perimeter disposed above said captured portion of said flexible tarpaulin sheet, and means for securing said first and second base plates together and securing said captured portion of said flexible tarpaulin sheet there between, said excess portion of said flexible tarpaulin sheet extending outwardly of the entirety of said side perimeters of said first and second base plates so as, in use, to provide an inner fold of said excess portion adjacent the entirety of said side perimeters of said first base elate at a position proximal of said plurality of wheel assemblies and to provide a remainder of said excess portion at a position distal of said plurality of wheel assemblies, said inner fold of said excess portion, in use, being capable of serving as a brace to said plurality of wheel assemblies in a plane below said first base plate and said remainder of said excess portion, being capable of extending outwardly of the entirety of said side perimeters in a plane either above or below said second base plate,(b) placing material, article, or debris upon said tarpaulin sheet or said second base plate, and (c) moving said tarpaulin dolly.

13. A method of moving material, article, or debris according to claim 12 further comprising the step of (d) unloading said material, article, or debris from tarpaulin dolly.

* * * * *